(12) United States Patent
Wu et al.

(10) Patent No.: US 11,267,744 B2
(45) Date of Patent: Mar. 8, 2022

(54) GOLD MINE CYANIDE TAILING DISPOSAL METHOD USING PASTE TECHNOLOGY

(71) Applicant: University of Science and Technology Beijing, Beijing (CN)

(72) Inventors: Aixiang Wu, Beijing (CN); Shaoyong Wang, Beijing (CN); Lianfu Zhang, Beijing (CN); Zhuen Ruan, Beijing (CN); Shenghua Yin, Beijing (CN); Hongjiang Wang, Beijing (CN); Yiming Wang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 415 days.

(21) Appl. No.: 16/462,539

(22) PCT Filed: May 30, 2018

(86) PCT No.: PCT/CN2018/089053
§ 371 (c)(1),
(2) Date: May 21, 2019

(87) PCT Pub. No.: WO2019/076061
PCT Pub. Date: Apr. 25, 2019

(65) Prior Publication Data
US 2019/0275571 A1 Sep. 12, 2019

(30) Foreign Application Priority Data
Oct. 17, 2017 (CN) .......................... 201710962030.4

(51) Int. Cl.
| C02F 11/12 | (2019.01) |
|---|---|
| C02F 11/121 | (2019.01) |
| B09B 3/00 | (2022.01) |
| B09B 1/00 | (2006.01) |

(52) U.S. Cl.
CPC ............ *C02F 11/121* (2013.01); *B09B 1/00* (2013.01); *B09B 3/00* (2013.01); *C02F 11/12* (2013.01); *B09B 2220/00* (2013.01)

(58) Field of Classification Search
CPC .......... C02F 11/12; C02F 11/121; B09B 1/00; B09B 3/00; B09B 2220/00
USPC ......................................................... 588/319
See application file for complete search history.

(56) References Cited

U.S. PATENT DOCUMENTS

2017/0291141 A1   10/2017   Dunham et al.

FOREIGN PATENT DOCUMENTS

| CN | 201173137 Y | 12/2008 |
|---|---|---|
| CN | 101469614 A | 7/2009 |
| CN | 103272686 A | 9/2013 |
| CN | 103553468 A | 2/2014 |
| CN | 104480948 A | 4/2015 |
| CN | 204502486 U | 7/2015 |
| CN | 104929683 A | 9/2015 |
| CN | 104944639 A | 9/2015 |
| CN | 204689778 U | 10/2015 |
| CN | 105107825 A | 12/2015 |
| CN | 205360700 U | 7/2016 |
| CN | 106854703 A | 6/2017 |
| CN | 108031696 A | 5/2018 |
| WO | 2017100064 A1 | 6/2017 |

*Primary Examiner* — Edward M Johnson
(74) *Attorney, Agent, or Firm* — Bayramoglu Law Offices LLC

(57) ABSTRACT

A gold mine cyanide tailing disposal method is provided. The disposal method performs a harmless decyanation treatment on a cyanide tailing slurry obtained from a mineral processing plant, and then performs a resource treatment where a cyanide tailing slurry is subjected to a thickening to obtain a higher concentration. When a backfill is needed, a paste is produced by adding a cementing material after a homogenized stirring of a two-stage horizontal agitator pumped to an underground mining site for filling by a plunger pump. The cementing material is to solidify an underflow and prevent cyanide from being filtered out. When a backfill is not needed, the paste is directly delivered to an open storage area for storing by the plunger pump.

3 Claims, 1 Drawing Sheet

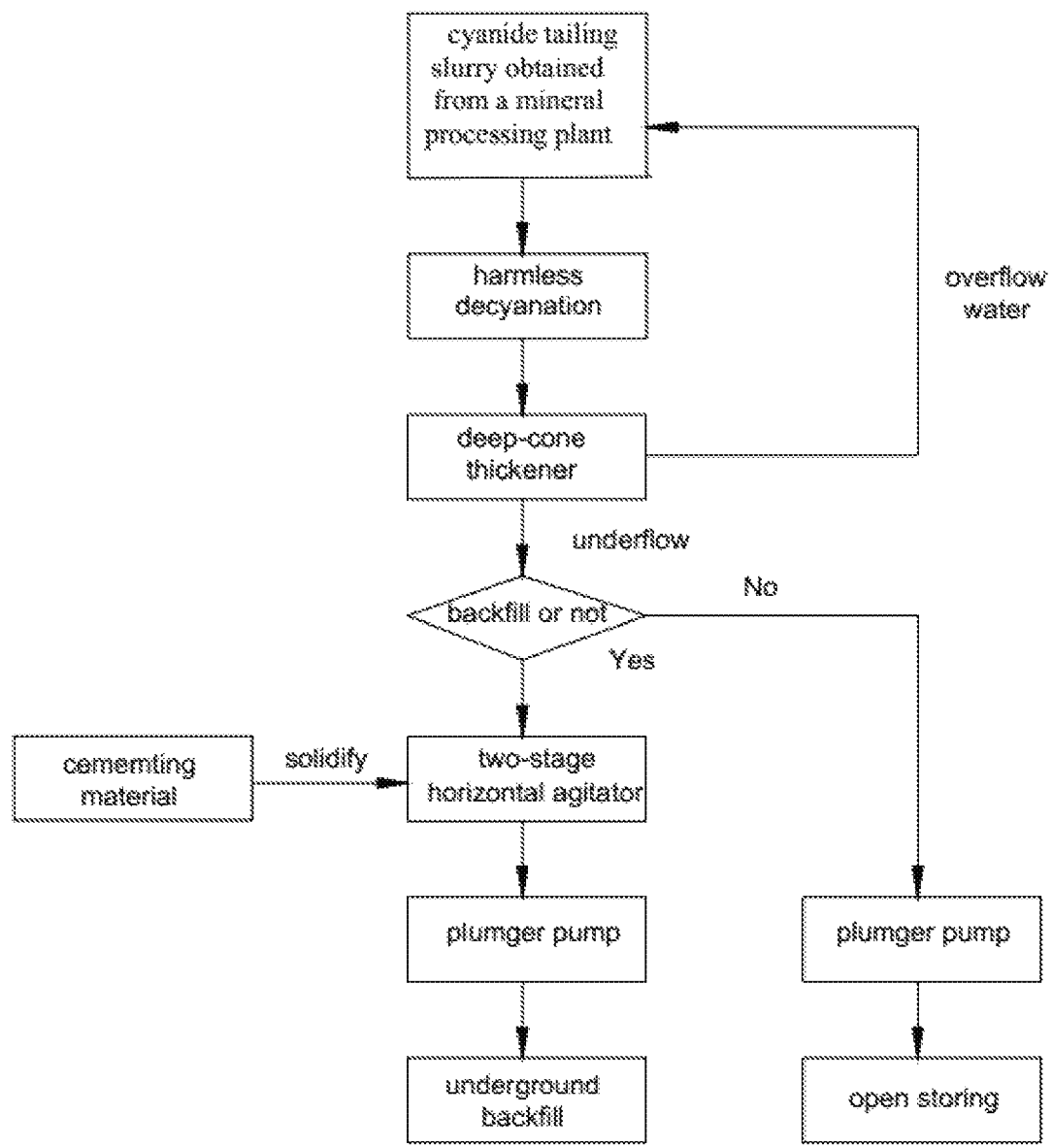

GOLD MINE CYANIDE TAILING DISPOSAL METHOD USING PASTE TECHNOLOGY

CROSS REFERENCE TO RELATED APPLICATIONS

This application is the national phase entry of International Application PCT/CN2018/089053, filed on May 30, 2018 which is based upon and claims priority to Chinese Patent Application No. CN 201710962030.4, filed on Oct. 17, 2017 the entire contents of which are incorporated herein by reference.

TECHNICAL FIELD

The present invention relates to the technical field of mining, particularly to a gold mine cyanide tailing disposal method using paste technology.

BACKGROUND

Environmental Protection Tax Law of the People's Republic of China coming into force on Jan. 1, 2018 stipulates that air pollutants, water pollutants, solid wastes and noise are taxable pollutants, and the tax to be paid for hazardous wastes is 1000 yuan/ton. In this context, the direct discharge of cyanide tailing, a hazardous waste, will then impose a serious tax burden on mining enterprises, thereby increasing the production cost and affecting the normal production efficiency of mines.

The cyanide process which can increase the recovery of gold is commonly used in the gold mineral processing. Statistically, China's gold manufacturing enterprises discharge 60 million tons of cyanide-containing tailings per year. The cyanide tailings have difficulty in deposition with small particle size and have complicated mineral compositions, i.e. a certain amount of cyanide ions and parts of remaining reagent. The cyanide tailings directly deposited on the ground surface causes many issues, and the cyanide in the mine tailings severely pollutes the rivers and underground water due to rainfall and infiltration of underground water, so it is harmful to the environment. Great importance has been attached to the harmless disposal and comprehensive utilization of cyanide tailings. The paste backfill gradually becomes the tech trend of the filling and mining technology in 21st century with its advantages of no segregation, no hydration, and no layering. After the harmless decyanation, the cyanide tailings are made into paste which not only can be directly discharged and deposited on the open-air storage area, but also can be used for underground backfill.

Given the huge demand for the comprehensive utilization of cyanide tailings and above-mentioned advantages of paste technology, the present invention provides a novel gold mine cyanide tailing disposal method using paste technology, which not only can achieve the environment-friendly disposal and comprehensive utilization of the cyanide tailings, but also can reach the purpose of goaf treatment, so it readily satisfies the construction concept of "Green Mining".

SUMMARY

The technical problem to be solved by the present invention is to provide a gold mine cyanide tailing disposal method using paste technology which is suitable for the underground gold mines that produce cyanide tailings and mining with backfill.

The disposal method mainly includes the following steps:

first, performing a harmless decyanation treatment on a cyanide tailing slurry obtained from a mineral processing plant, and controlling a concentration of cyanide ions in a tailing slurry after the decyanation treatment below 0.1 mg/L;

second, delivering the tailing after the harmless decyanation treatment in the first step to a deep-cone thickener to obtain an underflow with a predetermined concentration by a thickening and a dehydration; the concentration of the underflow after the thickening and the dehydration by the deep-cone thickener ranges 65-70%, and overflow water is recycled to the mineral processing plant for cycling;

third, delivering the underflow in the second step to an agitator when a backfill is needed, and adding a cementing material to solidify the underflow and prevent cyanide from being filtered out; wherein an amount of the cementing material depends on a strength of a paste filler required for an underground backfill, and a paste produced after a homogenized stirring of a two-stage horizontal agitator is pumped to an underground mining site for filling by a plunger pump; and fourth, delivering the underflow in the second step to an open storage area for storing by the plunger pump when the backfill is not needed.

The above-mentioned technical solutions of the present invention has the following advantages.

In the above technical solution, the cyanide tailings are subjected to a harmless decyanation treatment, and the concentration of the cyanide ions in the tailing slurry is controlled below 0.1 mg/L. The tailing after the decyanation treatment is thickened and dehydrated by the deep-cone thickener to obtain an underflow having a concentration range of 65-70 wt %. After that, alongside directly pumping the obtained underflow to the storage area for storing, the underflow may also be made into paste with the solidification of the cementing material for the underground backfill. Therefore, a sufficient and comprehensive utilization of the mining tailings, a reduction of the tailing discharge can be realized, thereby fundamentally avoiding a series of issues of ecology, safety, and cost caused by cyanide tailings. In a word, the disposal method avoids the hazards of cyanide ions to the environment in the deposition and storage, provides reliable sources for backfill material, reduces discharging of tailings, and saves the cost of backfill.

BRIEF DESCRIPTION OF THE DRAWINGS

The FIGURE shows a flow diagram showing the process of a gold mine cyanide tailing disposal method using paste technology according to the present invention.

DETAILED DESCRIPTION OF THE EMBODIMENTS

In order to clarify the technical problems to be solve, the technical solutions, and advantages, the present invention will be described in detail hereinafter with reference to the drawings and embodiments.

Considering the problems that the cyanide tailings are directly deposited and stored on the ground surface in the prior art, and there is a low comprehensive utilization rate, the present invention provides a harmless decyanation treatment of cyanide tailing and a disposal method using paste technology.

The FIGURE is a flow diagram showing the disposal method. The cyanide tailing of an example gold mine is subjected to a harmless decyanation treatment and a paste filling is performed according to the method shown in the FIGURE.

The example gold mine uses a cyanidation of gold flotation concentrate to recycle the metal Au. The cyanide tailings produced by a mineral processing contain cyanide ions and other chemical reagents which will pollute the surface water system and underground water and cause serious environmental problems when being directly deposited and stored on the ground. Further, since the example gold mine uses the backfill mining technology, the mining tailings without a decyanation treatment will pollute the underground mining area, thereby threatening the mining security, being unsuitable to be used as a source of the filling material. In order to achieve the comprehensive utilization of the cyanide tailings, reduce pollution to the environment, and increase sources for filling material, the method where the tailing after a harmless decyanation treatment is made as a paste for backfill or directly storing on the ground surface is used as researches. The specific implementation steps are described below.

Step 1: a harmless decyanation treatment is performed on a cyanide tailing slurry obtained from a mineral processing, and a concentration of cyanide ions in a tailing slurry after the decyanation treatment is controlled below 0.1 mg/L which is lower than the national standard 0.5 mg/L.

Step 2: the tailing after the harmless decyanation treatment in step one is delivered to a deep-cone thickener to obtain an underflow with a predetermined concentration by a thickening and a dehydration. The concentration of the underflow after the thickening and the dehydration by the deep-cone thickener ranges 65-70 wt %, and overflow water produced by the deep-cone thickener is recycled to the mineral processing plant for cycling.

Step 3: the underflow in the second step is delivered to a two-stage horizontal agitator when a backfill is needed, and a cementing material is added to solidify the underflow. An amount of the cementing material depends on a strength of a paste filler required for an underground backfill, a concentrated tailing and the cementing material are sufficiently homogenized and mixed to ensure the strength consistency of the paste, and a paste produced after a homogenized stirring is pumped to an underground mining area for filling by a plunger pump.

Step 4: the underflow in the second step is delivered to an open storage area for storing by the plunger pump when the backfill is not needed. The tailing after harmless treatment is stored on the ground surface without polluting the surface water and the underground water, which can protect the environment while reducing the management cost.

Before the implementation of the technical solutions, the cyanide tailings are discharged to a ground surface storage area. In order to reduce the pollution to the surface water, the storage area is processed with waterproof treatment. However, there is still a leakage, which causes serious water pollution problem and high treatment cost. Since the cyanide tailings itself contain cyanide ions and other reagents, it will pollute the underground working environment and threaten the production security as an underground filling material. That is why the cyanide tailings of the mineral processing plant always cannot be used as the filling material, thereby causing an extraordinary waste and increase of the filling cost. With the application of the provided solutions, the tailings after a harmless decyanation treatment are made into paste to be used as filling material for a safe underground backfill, which effectively utilizes the tailing resources, and the harmful ions are solidified by the cementing material. The tailings not used for filling can be directly discharged on the open storage area, so the problems of environment pollution are solved with a lower maintenance cost. In a word, the technical solution can reduce the filling coat while protecting the ecological environment, enhancing the security of the mining area, and increasing the economic benefit of the mines.

The description above is about the preferred embodiments of the present invention. It should be noted that, various improvements and modifications may be made by those of ordinary skill in the art without departing from the principle of the present invention, and these improvements and modifications should also be considered as falling within the scope of the present invention.

What is claimed is:

1. A gold mine cyanide tailing disposal method using a paste technology comprising:
   performing a harmless decyanation treatment on a cyanide tailing slurry obtained from a mineral processing plant to obtain a tailing slurry;
   delivering the tailing slurry to a deep-cone thickener and performing thickening and dehydration to obtain a underflow with a predetermined concentration, and recycling overflow water to the mineral processing plant; and
   delivering the underflow to an agitator, adding a cementing material to solidify the underflow and prevent cyanide from being filtered out, and pumping a paste of the underflow produced after a homogenized stirring of the agitator to an underground mining site for backfilling by a plunger pump; or
   delivering the underflow to an open storage area for storing by the plunger pump,
   wherein a concentration of cyanide ions in the tailing slurry is controlled below 0.1 mg/L.

2. The gold mine cyanide tailing disposal method using the paste technology according to claim 1, wherein the predetermined concentration of the underflow is in a range of 65-70 wt %.

3. The gold mine cyanide tailing disposal method using the paste technology according to the claim 1, wherein an amount of the cementing material depends on a strength requirement of a filler required for the backfilling.

* * * * *